United States Patent [19]

Opperthauser

[11] Patent Number: 4,751,999
[45] Date of Patent: Jun. 21, 1988

[54] STORAGE CONVEYOR SYSTEM

[75] Inventor: Keith G. Opperthauser, Holly, Mich.

[73] Assignee: Automated Systems, Inc., Auburn Hills, Mich.

[21] Appl. No.: 856,801

[22] Filed: Apr. 28, 1986

[51] Int. Cl.⁴ .............................................. B65G 13/02
[52] U.S. Cl. ................................... 198/778; 198/829
[58] Field of Search .............. 198/778, 842, 852, 829; 474/902, 903; 384/512, 498

[56] References Cited

U.S. PATENT DOCUMENTS

| | | | |
|---|---|---|---|
| 1,523,971 | 1/1925 | Johnsen | 198/778 |
| 1,975,296 | 10/1934 | Ross | 384/547 |
| 2,421,685 | 6/1947 | Crot et al. | 384/498 |
| 3,125,383 | 3/1964 | Stahlecker et al. | 384/512 |
| 3,768,631 | 10/1973 | Wahren | 198/852 |
| 4,184,588 | 1/1980 | Lapeyre | 198/778 |
| 4,603,983 | 8/1986 | Hofmann et al. | 384/512 |

FOREIGN PATENT DOCUMENTS 295274 12/1953 Switzerland ........................ 198/829

Primary Examiner—Robert J. Spar
Assistant Examiner—Cheryl L. Gastineau
Attorney, Agent, or Firm—Harness, Dickey & Pierce

[57] ABSTRACT

The present invention discloses an inclining consecutive alternating direction track storage conveyor system including at least one or more axles having at least two or more discs positioned on the axle for changing direction of a belt from one inclining track to the next inclining consecutive alternating direction track. Also, a staggered roller body configuration track is disclosed.

14 Claims, 3 Drawing Sheets

STORAGE CONVEYOR SYSTEM

TECHNICAL FIELD

The present invention relates to conveyor devices and particularly to a conveyor which flows in alternating directions to transport and store workpieces.

BACKGROUND OF THE INVENTION

Storage type conveyors are most often employed in manufacturing facilities to temporarily hold workpieces between workstations or until the workpieces can be transported. One type of such storage conveyor systems includes a belt which runs along inclined tracks which run in consecutive alternating directions in a stacked arrangement. Frictional engagement between the conveyor belt and the workpieces enables the workpieces to be transported and permits the belt drive to continue to operate even while the flow of workpieces is stopped for any reason. Typical storage conveyors have a frame with rotating discs at opposing ends which change the direction of travel of the conveyor belt. According to present conveyor designs, these discs are individually mounted to the frame by their own support structure. These individually mounted discs have a precision bore for mounting of a bearing and are cantalever mounted on a short shaft. The disc and shaft must be precisely positioned onto the frame to insure the proper smooth flow of the conveyor belt along the alternating direction tracks.

The disc and shaft arrangement according to the prior art has several additional disadvantages. The requirement of separately adjusting the alignment of each disc of the conveyor requires a great deal of time and manpower to set up the machine and perform periodic adjustments. Further, the discs must be precision bored so that the bearing which is pressed into the bore will be properly aligned with respect to the mounting shaft. This precise boring requirement adds to the cost of fabricating the discs. Moreover, if a disc is damaged in use, its alignment with respect to the bearing cannot be corrected, thereby necessitating disc replacement.

Designers of conveyor systems are further constantly striving to reduce the friction of moving the belt in conveyor systems. A reduction of frictional drag of the movement of the belt reduces the tension level applied to the belt at the belt drive, thereby enabling the belt to be made longer to increase the workpiece storage capacity of the system, or enables the use of lower tension capacity belts and lower horsepower drive systems than would otherwise be necessary. Present conveyors of the type of that according to this invention employ a dense plastic platform which supports the links of the conveyor belt. Although the plastic platform material is chosen to reduce friction, the frictional drag produced limits the total capacity of the storage conveyor system. Furthermore, a plastic platform is presently used to support the belt as it travels around the discs, adding to frictional drag.

SUMMARY OF THE INVENTION

The present invention overcomes the above-mentioned disadvantages of storage conveyor systems. In accordance with this invention, an improved means for positioning the conveyor discs is provided. A number of discs are attached to a single axle mounted to the conveyor frame. Adjusting members connected to the frame are used for selectively positioning one or both ends of the axle with respect to the frame at a desired angle. This disc mounting system, therefore, does away with a requirement that each disc be separately mounted and adjusted relative to the frame since all of the discs on a single axle are adjusted simultaneously.

An improved means for mounting the discs to the associated axle is provided by employing a pair of bearing housings which retain self-adjusting bearings. This disc mounting system simplifies fabrication and alignment of the discs and enables the discs to be realigned in the field, if needed.

Another aspect of the present invention provides roller bearings which support the belt and reduces friction on the belt as it moves along the conveyor tracks. The bearings are attached to belt guides and are mounted in a staggered arrangement which reduces the number of bearings required while providing the necessary support for the belt. Frictional drag on the belt is further reduced by the novel disc design in accordance with this invention. In accordance with this invention, the discs include a portion for supporting the belt which rotates with the remainder of the disc, thereby reducing frictional drag.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
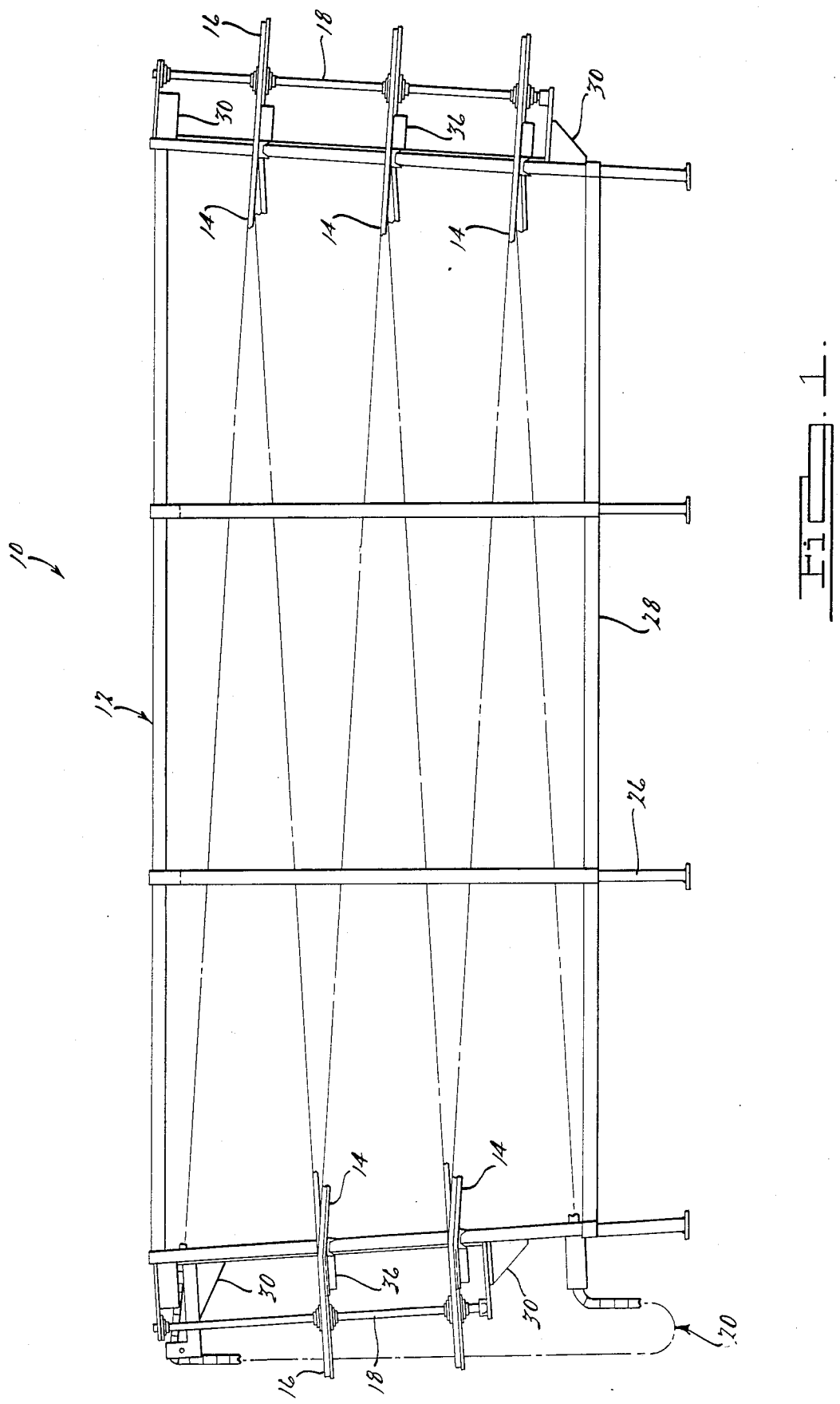
FIG. 1 is a front elevational view of a storage conveyor system in accordance with the present invention.
Figure 2:
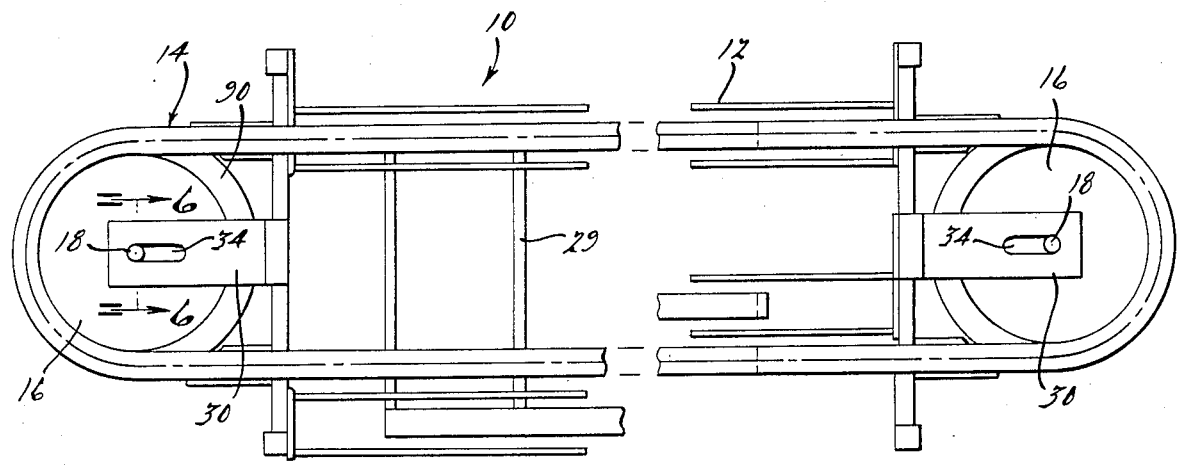
FIG. 2 is a top plan view of FIG. 1.

A storage conveyor system according to the present invention is generally shown by FIGS. 1 and 2 and is designated by reference character 10. Storage conveyor system 10 includes frame 12, a plurality of inclined alternating direction tracks 14, turn discs 16, at least one or more axles 18 for positioning the discs, and a belt 20. Tracks 14 are positioned on frame 12 as shown in FIG. 1. Discs 16 are mounted on axles 18 which, in turn, are secured to frame 12. The endless link type belt 20, which moves workpieces 22, is guided by tracks 14 and discs 16, and is driven by a conventional motor drive 24. With particular reference to FIG. 1, workpieces 22 travel along tracks 14 in a serpentine upward spiral manner, starting at the lower portion of frame 12, moving along a portion of track 14 until it reaches one of turn discs 16, where its direction is reversed, and continues to travel upwardly in this fashion to the top portion of frame 12. Belt 20 leaves tracks 14 at the uppermost portion of frame 12 and re-enters frame 12 at the lowermost portion of the tracks.

Frame 12 is formed by a plurality of vertical, horizontal and cross support members 26, 28 and 29, respectively, best shown in FIG. 1. Several arms 30 extend from end vertical support members 32 and support the ends of axles 18 on frame 12. Arms 30 may have an elongated aperture 34 which enables the position of axles 18 with respect to frame 12 to be adjusted. Several brackets 36 extend from vertical support members 26 and provide support for tracks 14. Tracks 14 are mounted at the desired angle with respect to horizontal support members 28 so that workpieces 22 will flow between discs 16 as desired.

Figure 3:
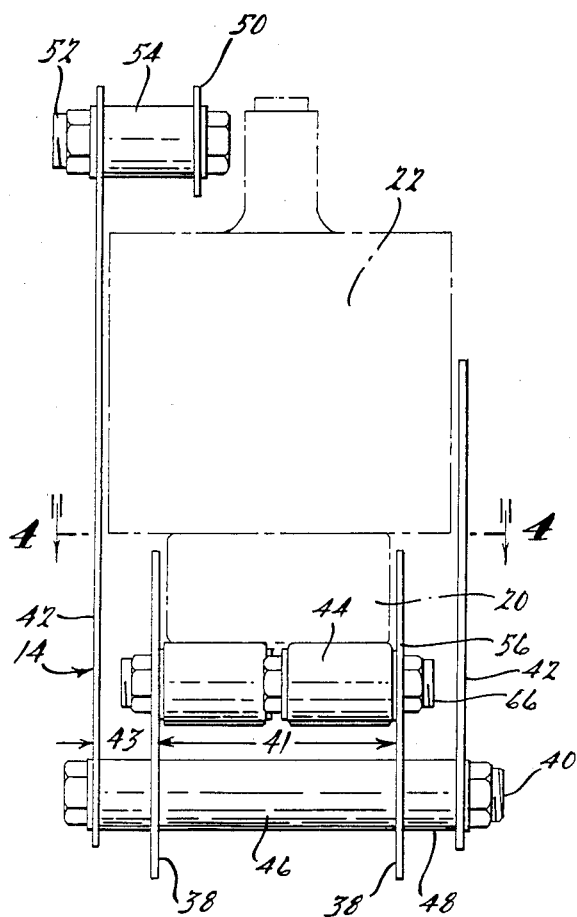
FIG. 3 is a partial cross-sectional view of a track of the present invention, showing a workpiece traveling along the track.
Figure 4:
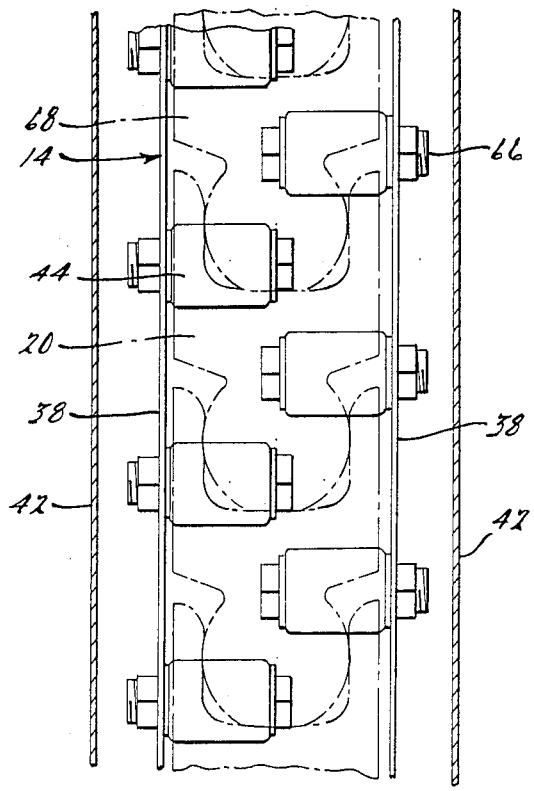
FIG. 4 is a partial cross-sectional view along line 4—4 of FIG. 3.

As best seen in FIGS. 3 and 4, tracks 14 include a pair of separated belt guides 38, a pair of part retainers 42, a plurality of fasteners 40, and a plurality of roller bearings 44. Belt guides 38 are preferably elongated sheet metal strips having at least one row of apertures. Guides 38 are separated by spacers 46 to define a gap 41 therebetween. Spacers 46 and 48 are positioned concentrically around fasteners 40. Fasteners 40 secure guides 38 and part retainers 42 together. Part retainers 42 are preferably elongated sheet metal strips also having a row of apertures. Retainers 42 are positioned parallel to one another and outside of belt guides 38. Spacers 48 are positioned concentrically around fasteners 40 between belt guides 38 and part retainers 42, forming gap 43. Fasteners 40 also secure part retainers 42 together on spacers 48. Thus, belt guides 38 and part retainers 42 are secured by common fasteners 40 forming track 14. Another part retainer 50 may be positioned above workpieces 22 to prevent the workpieces from being lifted vertically off of belt 20. Part retainer 50 is an elongated sheet metal strip which is positioned on one of part retainers 42 by fasteners 52 and spacers 54.

Belt guides 38 have a row of apertures 56 for securing roller bearings 44. Apertures 56 are positioned to permit a staggered positioning of roller bearings 44, as shown in FIG. 4. Roller bearings 44 are conventional hollow type bearings and are secured to guides 38 by fasteners 66. Roller bearings 44 extend from guides 38 approximately halfway across gap 41. The distance between consecutive roller bearings 44 is such that each link 68 (shown in phantom lines in FIG. 4) of belt 20 is supported by at least two roller bearings 44 at all times, thereby supporting the belt for smooth flow while minimizing the total number of bearings required. Roller bearing 44 enables belt 20 to be moved with a minimum of frictional drag.

Figure 5:
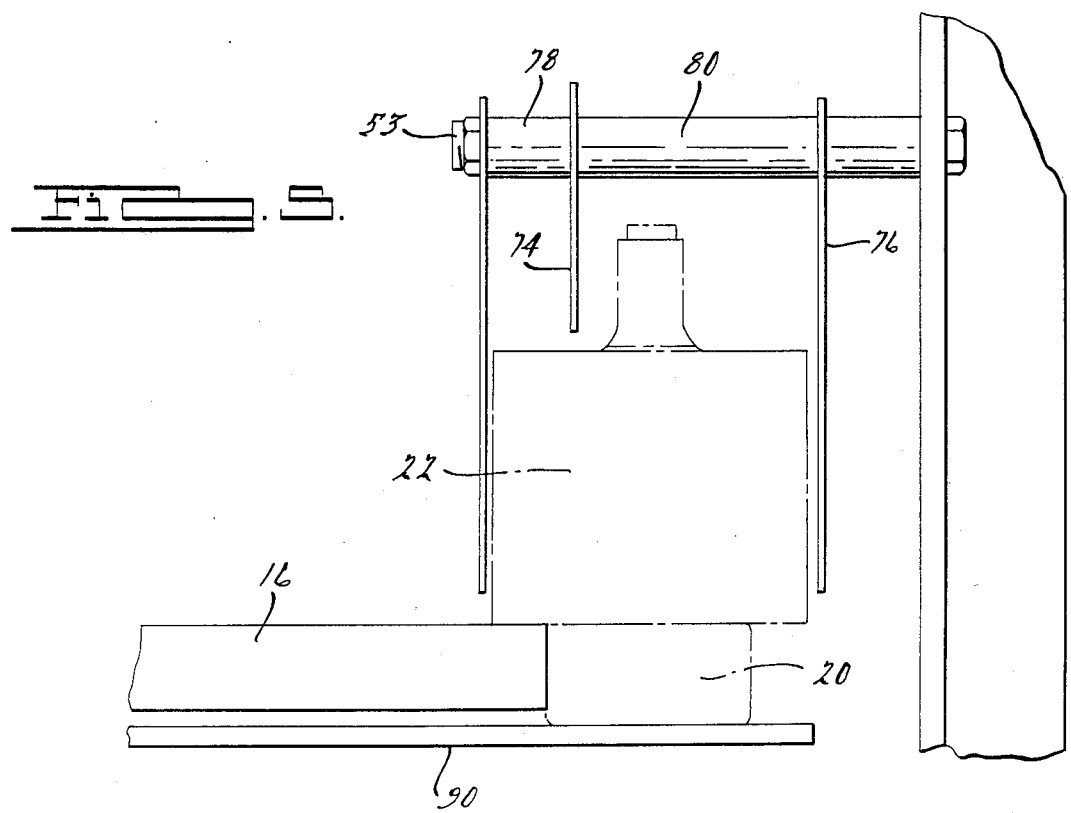
FIG. 5 is a side view of the guide assembly which surrounds the disc assemblies.

FIG. 5 illustrates workpiece 22 traveling on belt 20 as it moves around turn disc 16 outside frame 12. Workpiece 22 is maintained on belt 20 by another set of part retainers 72, 74 and 76. Retainers 72, 74 and 76 are curved around the periphery of disc 16, thereby guiding workpieces 22 as they travel around the disc. Spacers 78 and 80 separate retainers 72, 74 and 76 from one another and fasteners 53 are positioned coaxially with spacers 78 and 80 to secure the components together. Generally, retainer 74 is positioned between retainers 72 and 76 and has a width substantially less than the other retainer for prohibiting upward vertical movement of workpieces 22 while they are traveling on belt 20.

With particular reference to FIG. 5, turn discs 16 each define a radially extending portion 90 which provides a means for supporting belt 20. Extending portion 90 may be defined by a separate component secured to turn disc 16 by conventional means, or it may be an integral part of the turn disc. Since radially extending portion 90 rotates with disc 16, frictional drag on belt 20 is reduced as compared with prior art designs having a non-rotating belt support.

Figure 6:
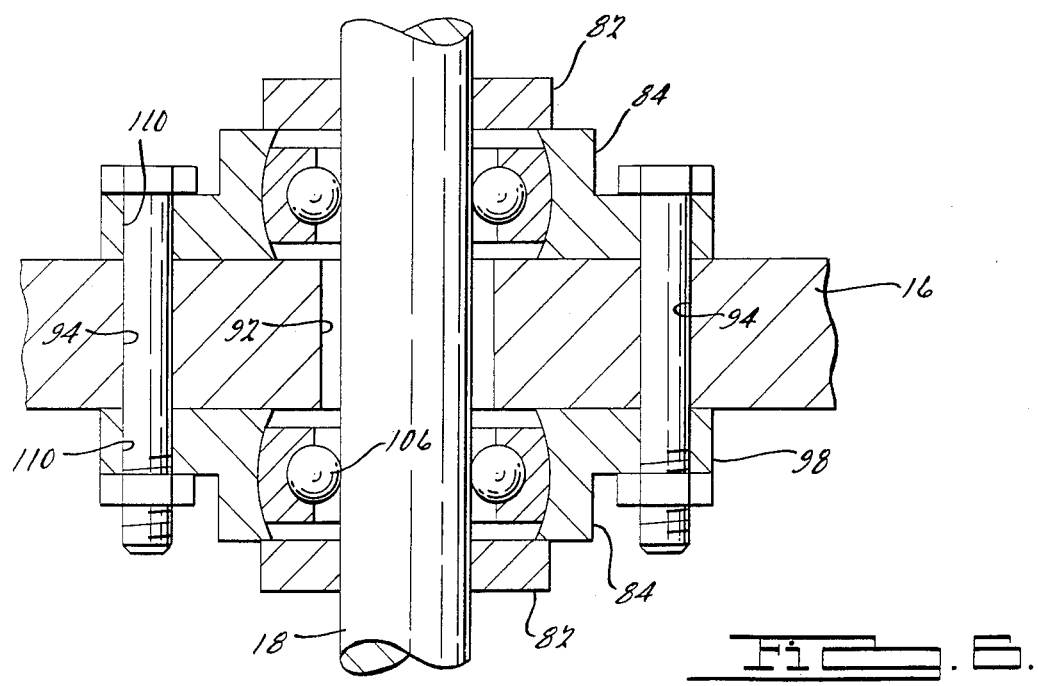
FIG. 6 is a cross-sectional view of a disc assembly taken along line 6—6 of FIG. 2.

With particular reference to FIG. 6, turn disc 16 is shown mounted on axle 18. Disc 16 is mounted by keepers 82 and bearing assemblies 84. Turn disc 16 is circular and has central aperture 92 which enables axle 18 to pass through the turn disc. Central aperture 92 has a diameter larger than axle 18 to enable angular adjustment of turn disc 16 with respect to axle 18. Other apertures 94 within disc 16 enable fasteners to pass through the disc for securing bearing assemblies 84. Bearing assemblies 84 include housing 98 with bearings 106 installed therein. Bearings 106 are a self-adjusting type, enabling their alignment with respect to housing 98 to be adjusted. Housings 98 have apertures 110 for passing a conventional fastener 112 therethrough to secure bearing assemblies 86 onto turn disc 16. During assembly of disc 16, bearing assemblies 84 are placed on each side of the disc. A fixture is used to align disc 16 perpendicular to axle 18 and then fasteners 112 are secured, thereby fixing the proper alignment of disc 16. Keepers 82 secure turn disc 16 and bearing assemblies 86 onto axle 18 at the desired axial position. This system for mounting discs 16 to axle 18 is vastly improved over conventional disc assemblies which require a machined bearing retainer bore within the disc to align the disc.

Turn discs 16, bearing assemblies 86 and keepers 82 are positioned onto axles 18. Axles 18 are positioned with respect to frame 12 by frame arms 30. Belt 20 is positioned on tracks 14 and around discs 16. Turn discs 16 are adjusted and aligned so that belt 20 will make a smooth transition off of tracks 14 onto turn discs 16. Axles 18 are adjusted in apertures 34 of arm 30 so that the desired angle with respect to frame 12 is achieved. Thus, all the turn discs 16 on each side of frame 12 are aligned at the same time, and the conveyor storage system is ready for use. Alignment of discs 16 as described above eliminates the requirement of prior art storage type conveyors wherein each of the discs must be aligned independently.

While the above description constitutes the preferred embodiments of the present invention, it will be appreciated that the invention is susceptible to modification, variation and change without departing from the proper scope and fair meaning of the accompanying claims.

What is claimed is:

1. A conveyor storage system comprising:
a frame,
a series of inclined tracks supported on said frame,
a belt guided for movement along said tracks,
means for driving said belt along said tracks,
a plurality of disc assemblies positioned at each end of said frame for changing the direction of motion of said belt, said disc assemblies being rotatable in response to movement of said driven belt,
means for supporting said disc assemblies, said supporting means including:
an axle positioned at an end of said frame,
axle mounting means for connecting said axle to said frame, said axle mounting means enabling the relative orientation of said axle with respect to said frame to be adjusted, and
at least two of said disc assemblies positioned and carried by said axle whereby adjustment of said relative orientation of said axle with respect to said frame causes the angular orientation of each of said discs on said axle to be adjusted with respect to said frame, and said disc assemblies including:
 a turn disc having a central aperture with a diameter greater than the axle forming a peripheral gap between said turn disc and said axle for enabling angular adjustment of the turn disc with respect to the axle,
 support means radially extending from said turn disc for supporting said belt on said discs, a pair of self-aligning bearing assemblies associated with each said turn disc for enabling said disc to rotate with respect to said axle wherein said self-aligning bearing assemblies have a bore closely receiving said shaft and a mounting flange portion whereby the relationship between the axis of said bore and the plane of said mounting flange can be adjusted within a narrow range, and wherein said bearing assemblies are mounted to opposing face surfaces of said turn discs whereby, when said mounting flange portions of said bearing assemblies are fastened to said turn disc, the orientation between the longitudinal axis of said axle and the plane of rotation of said turn disc is fixed, and
means for retaining said turn discs, support means, and bearing assemblies on said axle at desired longitudinal positions along said axle.

2. The conveyor storage system according to claim 1 wherein said axle mounting means includes an arm connected to said frame having an aperture for receiving said axle which permits the relative orientation between said axle and said arm to be varied.

3. The conveyor storage system according to claim 1 wherein said bearing assembly enabling angular adjustment of said bearing assembly with respect to said axle.

4. The conveyor storage system according to claim 1 further comprising a pair of bearing assemblies one of said assemblies secured above each said disc and the other secured below each said disc.

5. A conveyor storage system including a frame, a series of upward inclined consecutive alternating direction tracks, an endless link type belt guided for movement along said tracks, drive means for transporting said belt, discs positioned at each end of said frame for changing the direction of said belt at the end of said tracks, said tracks comprising;
 a pair of separated belt guides, a plurality of rollers secured to each of said guides, said rollers projecting into a gap between said guides, and said rollers forming an alternating staggered pattern in said gap between said guides such that each link of said belt is supported by at least two of said rollers at all times.

6. The conveyor storage system according to claim 5 wherein said rollers project approximately halfway across said gap.

7. A conveyor storage system comprising:
 a frame,
 a series of upward inclined consecutive alternating direction tracks supported on said frame,
 an endless link type belt guided for movement along said tracks,
 means for driving said endless belt along said tracks,
 a plurality of discs positioned at opposing ends of said frame for changing the direction of motion of said belt at the end of said tracks, and
 means for supporting said discs, said supporting means including:
  an axle having ends secured to said frame, said discs positioned and secured to said axle, said discs communicating with said belt and changing the direction of movement of said belt from one inclined track to the next inclining consecutive alternating direction track, said discs being rotatable in response to movement of said driven belt,
 means on said frame for selectively positioning at least one end of said axle with respect to said frame means, and
 a pair of guides, said guides separated by a gap having a plurality of spacers therebetween defining a gap therebetween, a plurality of rollers secured to each of said guides, said rollers projecting into said gap a distance from each guide, and said rollers forming an alternating staggered pattern in said gap between said guides.

8. The conveyor storage system according to claim 7 wherein said discs are comprised of a turn disc having a support disc secured to said turn disc which rotates with turn disc.

9. The conveyor storage system according to claim 8 wherein said support disc is concentric with said turn disc.

10. The conveyor storage system according to claim 9 wherein said support disc extends around said turn disc's perimeter.

11. The conveyor storage system according to claim 10 wherein at least one or more bearing assemblies are secured on said turn discs and positioned around said axle.

12. The conveyor storage system according to claim 11 wherein said bearing assembly is self-adjusting.

13. The conveyor storage system according to claim 7 wherein said rollers project approximately halfway across said gap.

14. The conveyor storage system according to claim 13 wherein the distance between said rollers in said staggered pattern is such that a link of said belt rests on at least two rollers on one of said guides and at least one roller on the opposing guide.

* * * * *